(12) United States Patent
Ward et al.

(10) Patent No.: US 9,901,027 B1
(45) Date of Patent: Feb. 27, 2018

(54) ANHYDROUS AMMONIA VAPOR CHARGE UNIT FOR AN APPLICATOR TANK

(71) Applicant: CONTINENTAL NH3 PRODUCTS CO., INC., Dallas, TX (US)

(72) Inventors: David P Ward, Dallas, TX (US); Judd K Stretcher, Dallas, TX (US)

(73) Assignee: CONTINENTAL NH3 PRODUCTS CO., INC., Dallas, TX (US)

( * ) Notice: Subject to any disclaimer, the term of this patent is extended or adjusted under 35 U.S.C. 154(b) by 101 days.

(21) Appl. No.: 14/684,238

(22) Filed: Apr. 10, 2015

Related U.S. Application Data

(60) Provisional application No. 61/977,851, filed on Apr. 10, 2014.

(51) Int. Cl.
A01C 23/02 (2006.01)
F22B 1/16 (2006.01)
F22B 1/28 (2006.01)

(52) U.S. Cl.
CPC .............. A01C 23/024 (2013.01); F22B 1/16 (2013.01); F22B 1/284 (2013.01)

(58) Field of Classification Search
CPC .... F22B 1/16; F22B 1/00; F22B 1/284; F22B 1/28; A01C 23/024; A01C 23/023; A01C 23/02; A01C 23/00
See application file for complete search history.

(56) References Cited

U.S. PATENT DOCUMENTS 2,859,594 A * 11/1958 Peck .................... F17C 7/02
141/59
2007/0022927 A1 * 2/2007 Forsyth ............... A01C 23/024
111/119

* cited by examiner

Primary Examiner — Christopher J. Novosad
(74) Attorney, Agent, or Firm — Mark W Wandley; Handley Law Firm, PLLC

(57) ABSTRACT

An anhydrous ammonia vapor charge unit for an applicator tank maintains a pressure charge on an applicator tank. A secondary anhydrous ammonia tank is disposed adjacent to the applicator tank. Ammonia vapor from the secondary tank is passed through a vapor compressor and then is injected into the applicator tank to provide a greater pressure charge within the applicator tank. In a second embodiment, a small portion of a liquid flow stream of ammonia being removed from the applicator tank is separated from the flow stream, passed through a heat vaporizer for expanding from a liquid to a gas, passed through a vapor pressure, and then is injected into the applicator tank for maintaining the pressure charge on the applicator tank. Preferably the heat vaporizer used hydraulic fluid from a tractor to heat the anhydrous ammonia.

2 Claims, 7 Drawing Sheets

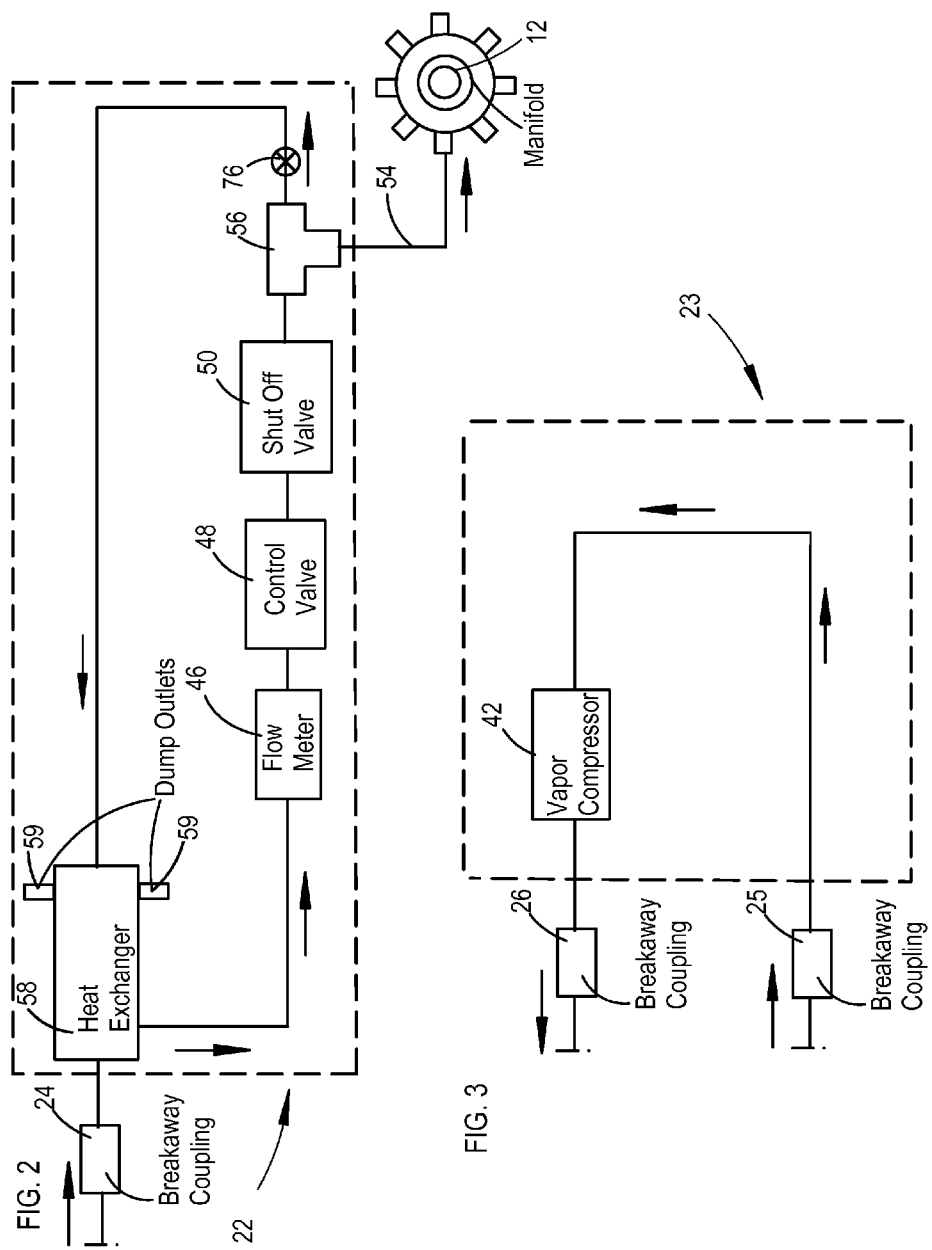

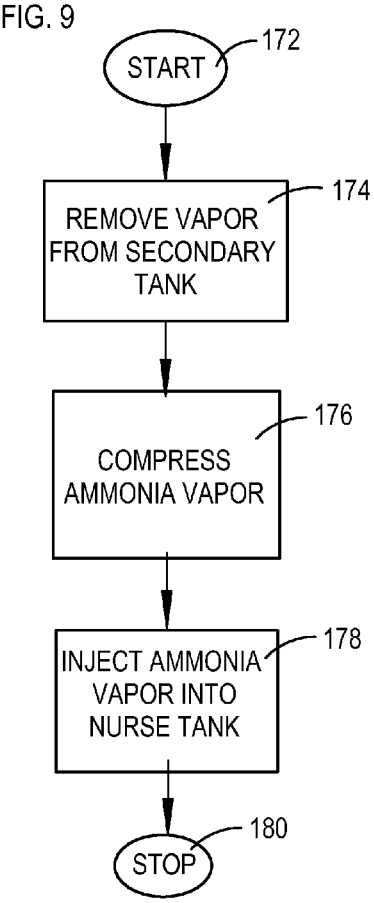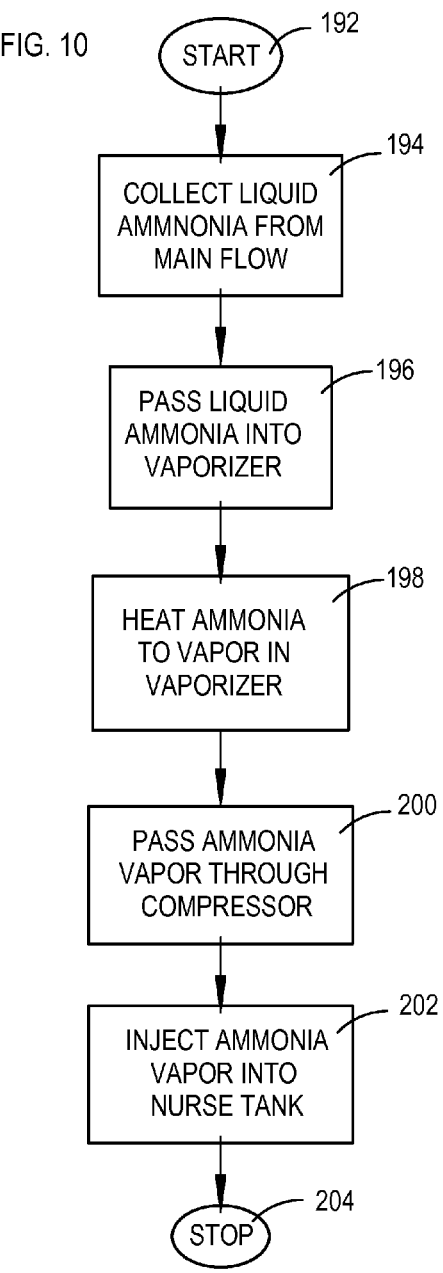
FIG. 9
FIG. 10

ANHYDROUS AMMONIA VAPOR CHARGE UNIT FOR AN APPLICATOR TANK

CROSS REFERENCE TO RELATED APPLICATIONS

The present application claims priority as a continuation in part of U.S. Provisional Patent Application Ser. No. 61/977,851 filed Apr. 10, 2014, entitled "Anhydrous Ammonia Heat Vaporizer for a Nurse Tank," and invented by David P. Ward.

TECHNICAL FIELD OF THE INVENTION

The present invention relates in general to ammonia fertilizer application systems for agricultural use, and in particular to an ammonia fertilizer spreader having flow dividers which mix a vapor and liquid ammonia into a homogeneous mixture prior to dividing and passing the ammonia to respective ground injector knives.

BACKGROUND OF THE INVENTION

Anhydrous ammonia $NH_3$ although first known as a refrigerant, is the lowest cost source of nitrogen for use as a fertilizer for fertilizing crops. Anhydrous ammonia $NH_3$ is made from natural gas and air, and is 82% nitrogen and 18% hydrogen by weight. Although anhydrous ammonia has a foul odor and is hazardous as an inhalant, it is a very popular fertilizer for use on row crops. For transport and storage, anhydrous ammonia is compressed so that it is a liquid at atmospheric temperatures. During application to fields for fertilizing row crops the anhydrous ammonia stored as liquid is injected into soil with a portion having expanded into a gas.

The typical electronically-controlled ammonia application system consists of an applicator tank, or nurse tank, trailed behind a tool bar which is attached to a tractor. A computer console is mounted accessible to the tractor operator. The typical mechanical ammonia application system is about the same as the electronic system, however it utilizes a manually-adjustable mechanical meter. The applicator tank is a trailer-mounted pressure vessel which contains the ammonia in its liquid state. A liquid withdrawal valve is typically mounted either at the bottom of the tank or at the top of the tank. If the liquid withdrawal valve is mounted at the typic of the tank a dip tube is provided which extends from the liquid withdrawal valve to the bottom of the tank for withdrawing the ammonia in liquid form. A suitable hose connects this valve to a filter connected to a main shutoff valve mounted on the tool bar. The ammonia then flows through a heat exchanger unit, then through a meter, then to an electronically controlled throttling valve, then to one or more dividing manifolds, and finally through suitable hoses to applicator knives which inject the ammonia into the soil. As the liquid ammonia either enters the liquid withdrawal valve if mounted to the bottom of the tank, or enters the dip tube located at the bottom of the tank for passing through a liquid withdrawal valve mounted to the top of the tank, the liquid ammonia begins to flow and its thermodynamic conditions begin to change. The ammonia begins to expand. This results in the formation of ammonia vapor within the system which must be removed by a heat exchanger unit prior to metering in order to assure a properly-measured quantity of ammonia to the applicator knives and into the soil. These systems work fairly well, but under certain conditions problems can arise. The greater expansion of the ammonia across the total system often forms more vapor than the typical heat exchanger unit can handle.

Often various types of electronics including GPS are used to assure that fertilizers are spread evenly across a field. However, over the last sixty years of using anhydrous ammonia injecting into the ground of a field, the accuracy is usually the best up to 10% in so far as assuring that the anhydrous ammonia is equally distributed across the various rows in a field. Unequal distribution of anhydrous ammonia in a field may often be observed by comparing the height of adjacent rows of crops, which have been observed to vary as much as two feet.

The anhydrous ammonia is metered to apply selected amounts for different crops, such as corn requires more than twice the amount of ammonia per acre than the smaller grain crops. Problems often occur in metering ammonia since it expands in going from a liquid to a gas, often changing in volume in a ratio of one to eight hundred. Anhydrous ammonia is also a very good refrigerant and its temperatures are reduced as it expands from a liquid to gas. The metering problem is also exacerbated by the requirement of dividing the anhydrous ammonia into equal flow streams to allow equal distribution of the ammonia along the tool bars for a conventional row crop injection systems. The tool bars are typically range from fifteen feet to eighty feet wide and are pulled behind a tractor, transverse to crop rows. The applicator knives are mounted to the tool bars and typically run from about two inches to six inches into the ground, and sometimes deeper, for depositing ammonia into the soil. The anhydrous ammonia moving to the tool bar is a flowing mixture of decreasing liquid, and increasing and expanding vapor which requires dividing into equal amounts for passing to the various applicator knives spaced apart along the length of the tool bar. Dividing anhydrous ammonia into equal flow streams is also made more difficult by the flow of the liquid and vapor phases separating into different slip stream flows, which is not a homogenous mixture.

As liquid ammonia is removed from the applicator tank, pressures within the applicator tank drop which lower pressures throughout the entire system, from the applicator tank to the injection knives. If pressures could be better maintained within the applicator tanks during operation the entire anhydrous ammonia application system could be operated at a higher pressure. In some cases the pressure may be high enough to not require a heat exchanger to refrigerate the ammonia flow stream prior to metering and dividing, and providing more even distribution along the toolbar with the liquid phase being increased and the gas phase being diminished.

Applicator tanks are typically returned to ammonia supply distributors with ammonia still inside the tanks, yet with insufficient amounts of moisture low of a pressure to maintain an adequate supply for dividing on the tool bar. The supplier will typically refill returned tanks with ammonia and return the tanks to the field for use. Air and its accompany moisture must be prevented from entering anhydrous ammonia tanks of suppliers will have to go to additional expense to clean spent tanks prior refilling and returning to the field for use.

SUMMARY OF THE INVENTION

A novel anhydrous ammonia vapor charge unit for an applicator tank is disclosed for maintaining a pressure charge on a applicator tank, which is also commonly referred to as a nurse tank. In a first embodiment, a secondary anhydrous ammonia tank, which is also referred to as a caddy tank, is provided for pulling behind a toolbar adjacent to the applicator tank. A vapor control unit is mounted to the toolbar for receiving ammonia vapor from the caddy tank, passing the ammonia vapor through a vapor compressor, and then injecting the compressed ammonia vapor into the applicator tank to provide a greater pressure charge within the applicator tank. In a second embodiment, a small portion of a liquid flow stream of ammonia being removed from the applicator tank is separated from the flow stream, passed through a heat vaporizer for expanding from a liquid to a gas. The heat vaporizer for anhydrous ammonia vaporizes ammonia using heat, expanding the ammonia to a volume of up to 800 times its original volume. This volume is then passed through a vapor compressor and re-inserted into the applicator tank for maintaining the pressure charge on the applicator tank. Preferably hydraulic fluid from a tractor is used for transferring heat to the anhydrous ammonia.

The heat vaporizer preferably has a housing which receives a dual wall flow tube assembly having an upper end cap with a first central flow passage and a lower end cap with a second central flow passage. Hydraulic fluid passes between in interior of the housing and an exterior of the dual wall flow tube assembly, through a central flow passage disposed centrally within the dual wall flow tube assembly, and outward there-from. Anhydrous ammonia is passed through the dual wall flow tube assembly, absorbing heat from the hydraulic fluid passing there-through. In other embodiments, an electric heating coil may be used for providing heat for vaporizing the liquid anhydrous ammonia.

DESCRIPTION OF THE DRAWINGS

For a more complete understanding of the present invention and the advantages thereof, reference is now made to the following description taken in conjunction with the accompanying Drawings in which FIGS. 1 through 10 show various aspects for an anhydrous ammonia heat vaporizer for a applicator tank made according to the present invention, as set forth below:

FIG. 1 is a top view of a tractor and an ammonia injection unit;

FIG. 2 is a bock diagram of an ammonia control unit;

FIG. 3 is a bock diagram of an ammonia vapor control unit;

FIG. 4 is partial top view of the tractor and a second ammonia injection unit;

FIG. 5 is a bock diagram of the a second ammonia control unit which incorporates a vapor control unit used for injecting compressed ammonia vapor into an ammonia applicator tank;

FIG. 6 is a longitudinal section view of an anhydrous ammonia heat vaporizer;

FIG. 7 is a longitudinal section view of an alternative anhydrous ammonia heat vaporizer;

FIG. 8 is a longitudinal section view of a liquid collector; and

FIGS. 9 and 10 are flow charts for processes for injecting pressurized ammonia vapor into a applicator tank to maintain a pressure charge on the applicator tank.

DETAILED DESCRIPTION OF THE INVENTION

Figure 1:
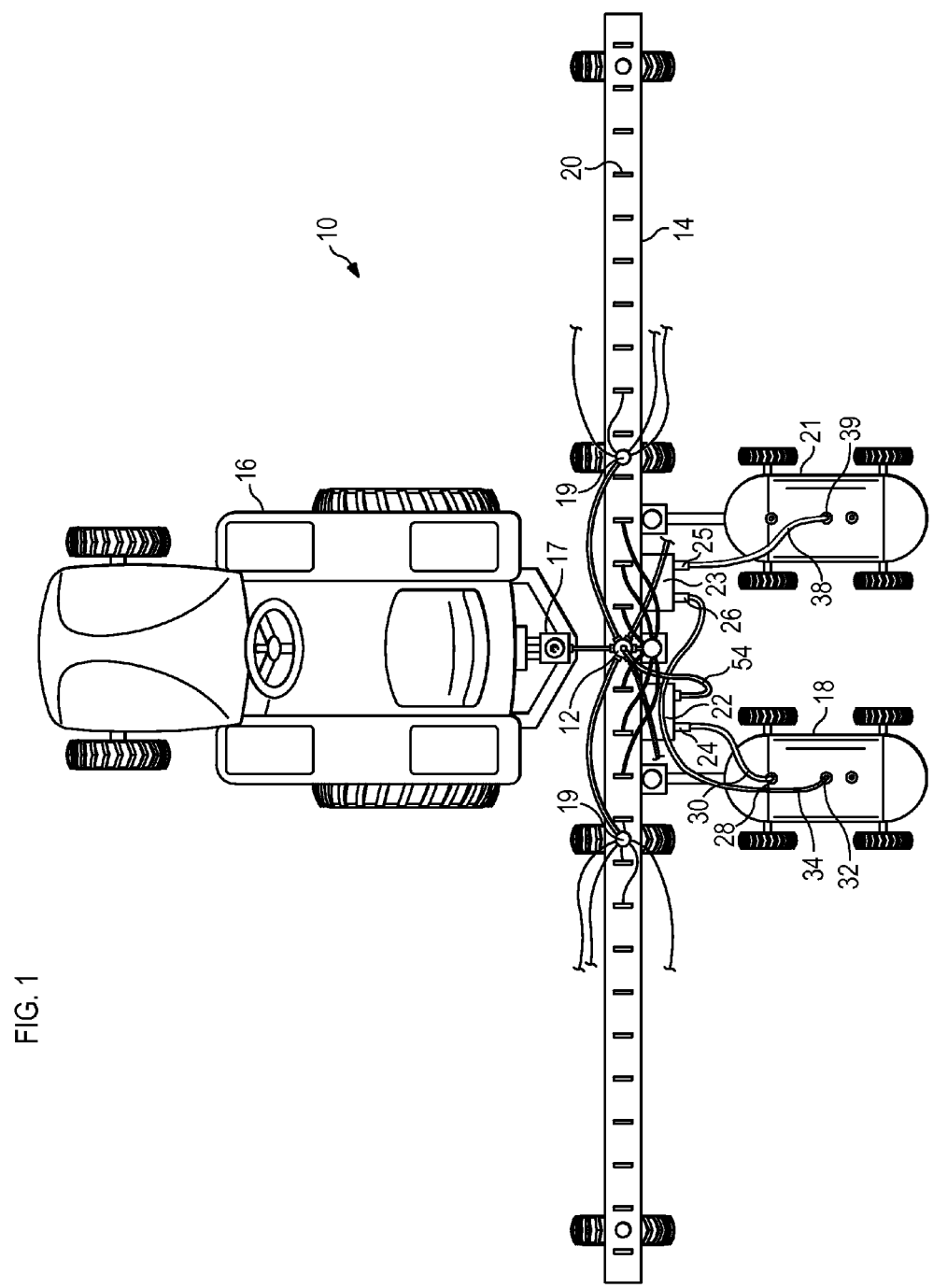

FIG. 1 is a top view a tractor 16 and an ammonia distribution system 10. The ammonia distribution system 10 includes an ammonia dividing manifold 12 mounted on a tool bar 14. The tractor 16 pulls the tool bar 14, an ammonia applicator tank 18, or nurse tank, and a secondary, caddy tank 21. An ammonia control unit 22 receives ammonia from the tank 18, then metered ammonia flows to ammonia dividing manifold 12, is divided, and then the divided flows are then further divided in sub-dividing manifolds 19 connected to applicator knives 20 mounted on tool bar 14. The applicator knives 20 inject precisely-metered and accurately-divided streams of ammonia liquid and vapor into the soil as the tractor 16 traverses an agricultural field. The control unit 22 has a breakaway coupling 24. A flow line 30 connects the breakaway coupling 24 to the outlet 28 and dip tube of the applicator tank 18. A vapor control unit 23 has a vapor compressor 42 and is mounted to the tool bar 14 and has a break away coupling 25 connecting to a flow line 38 and a vapor outlet 39 of the caddy tank 21. The vapor control unit 23 also has a breakaway coupling 26 which connected by a flow line 34 to the vapor return 32 of the applicator tank 18. A hydraulic unit 17 is preferably connected to the hydraulic system of the tractor 16.

FIG. 2 is a bock diagram of an ammonia control unit 22 mounted to the tool bar 14. A breakaway coupling 24 connects to a flow line 30 which is connected to the liquid outlet 28 of the applicator tank 18. The ammonia control unit 22 has a heat exchanger 58 for cooling anhydrous ammonia prior to metering the ammonia and vaporizing the ammonia in the control unit 22. As noted below, the heat exchanger 58 preferably uses cooling from expansion of a flow of ammonia bled off the main supply flow to cool inlet supply flow to minimize gas in the supply flow stream, providing liquid for more accurate flow measurements in the flow meter 46 and to the dividing manifolds 12 and 19. The breakaway coupling 24 is connected to a supply inlet of the heat exchanger 58 for passing anhydrous ammonia from the applicator tank 18 through the heat exchanger 58 and to the flow meter 46. The main flow of liquid ammonia will pass through a flow meter 46, a control valve 48 and a shut off valve 50 to a pipe tee 56. One branch of the second pipe tee 56 will continue to pass to the first ammonia manifold 12. A second branch of the pipe tee 56 will pass a small amount of the supply stream of ammonia through the flow orifice 76 and to the heat exchanger 58. In the heat exchanger 58 the small stream will be metered and then expanded to cool ammonia passing through the heat exchanger 58 to the pipe tee 44. Dump outlets 59 pass outward form the heat exchanger 58 the portion of ammonia expanded for cooling, which is then passed to one or more of the applicator knives 20 for injection into the ground.

FIG. 3 is a bock diagram of an ammonia vapor control unit 23. A flow line 38 is connected to the vapor outlet 39 of the caddy tank 21. Ammonia vapor from the caddy tank 21 will pass through the flow line 38 to the breakaway coupling 25 mounted to the control unit 23. The breakaway coupling 25 is connected to the vapor compressor 42 which pressurizes the ammonia vapor for passing through the breakaway coupling 26, the flow line 34 and into the vapor connector on the applicator tank 18. This adds an additional pressure charge to the applicator tank 18, allowing more of the liquid ammonia to be withdrawn from the tank 18 at pressure which are sufficient to allow dividing in the dividing manifolds 12 and 19.

Figure 4:
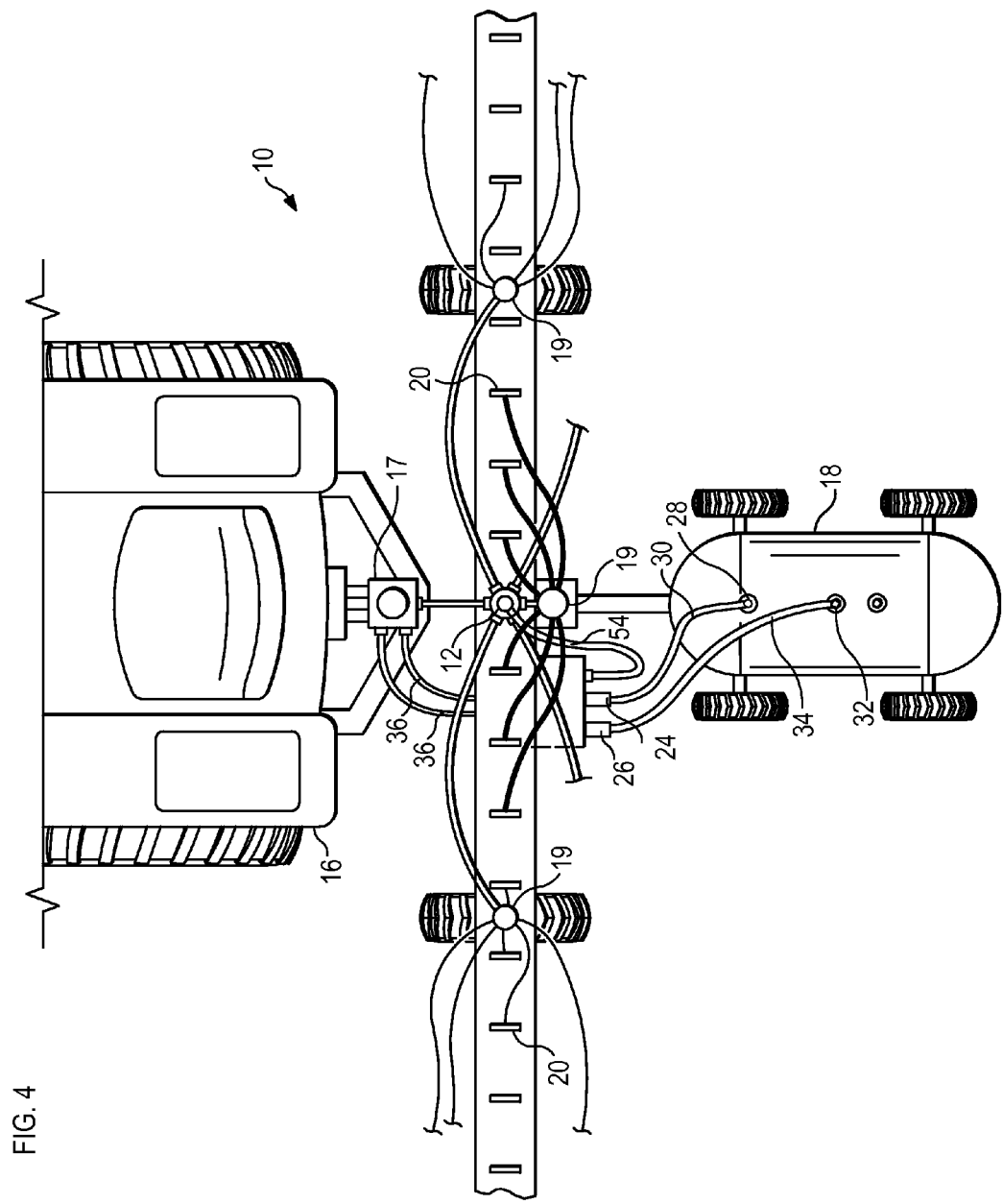

FIG. 4 is partial top view of the tractor 16 and a second ammonia distribution system 11. The ammonia distribution system 11 includes the ammonia dividing manifolds 12 and 19 mounted on the tool bar 14. An ammonia control unit 60 receives ammonia from the tank 18, then metered ammonia flows to ammonia dividing manifold 12, is divided, and then the divided flows are then further divided in the sub-dividing manifolds 19 connected to applicator knives 20 mounted on tool bar 14. The control unit 60 has two breakaway couplings 24 and 26. The flow line 30 connects the breakaway coupling 24 to the outlet 28 and dip tube of the applicator tank 18. The flow line 34 connects the breakaway coupling 26 to a vapor return 32 of the applicator tank 18. A hydraulic unit 17 is preferably connected to the hydraulic system of the tractor 16, and is connected by supply and return hydraulic hoses 36 to the ammonia control unit 60.

Figure 5:
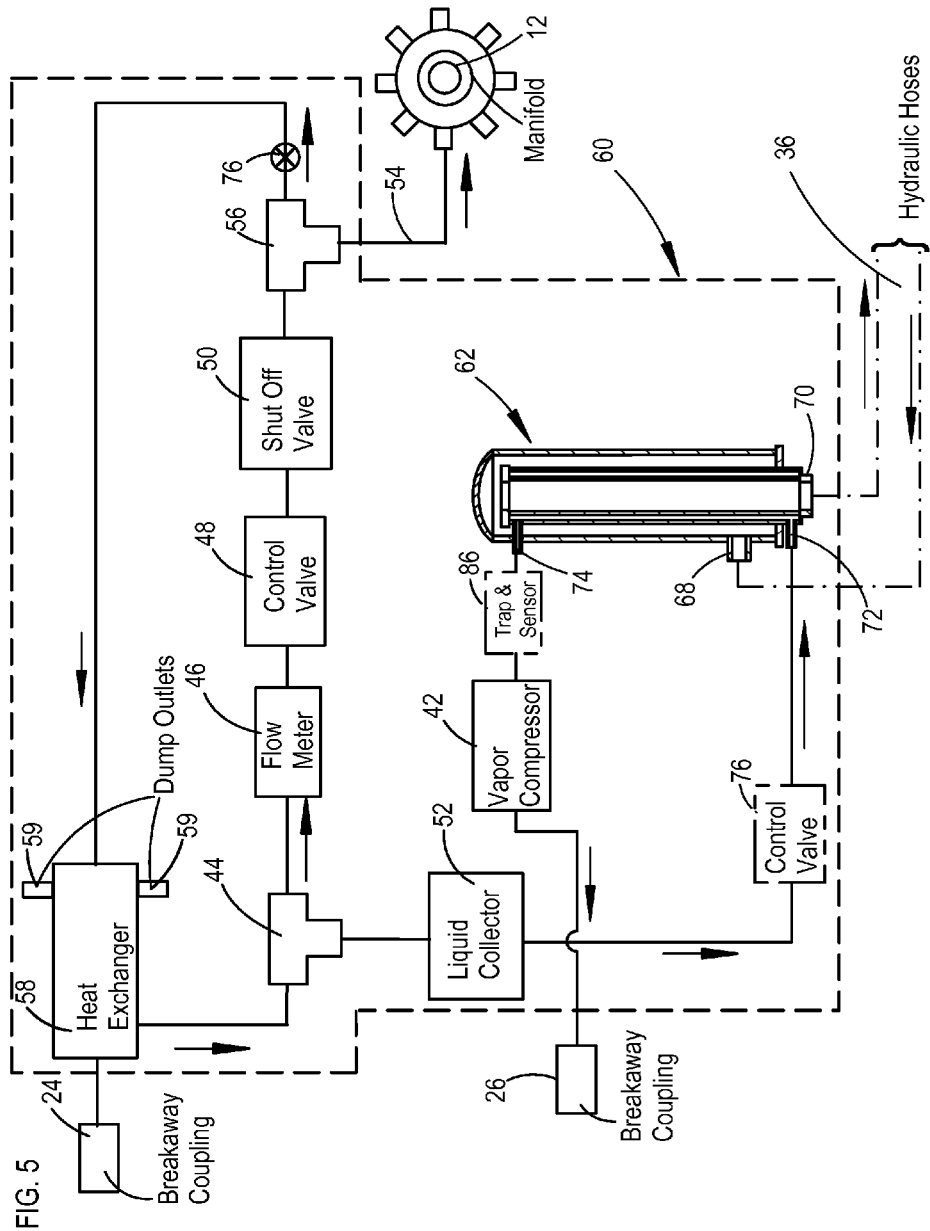

FIG. 5 is a bock diagram of an ammonia control unit 60 which may be used in place of the control unit 22 show in FIGS. 1 and 2. The ammonia control unit 60 has the heat exchanger 58 for cooling anhydrous ammonia prior metering the ammonia and prior to passing the ammonia into the heat vaporizer 62, and a vapor compressor 60 for compressing vaporized ammonia prior to insertion into the applicator tank 12. The control unit 60 functions similarly to the ammonia flow control unit 22 and the ammonia vapor control unit 23 as described above in reference to FIGS. 2, 3 and 4, except that the control unit 60 will preferably includes a liquid collector 52 and heat vaporizer 62 rather than a secondary caddy tank being towed behind the toolbar 14 with the applicator tank as shown in FIG. 1. A first branch of the pipe tee 44 is connected to a flow meter 46, which is connected to a flow valve 48, which is connected to a shut-off valve 50. The shut-off valve 50 is then connected to pipe tee 56. On branch of the pipe tee 56 is connected the first ammonia manifold 12 by a supply flow line 54. A second branch of the pipe tee 56 will pass a small amount of the supply stream of ammonia through the flow orifice 76 and to the heat exchanger 58. In the heat exchanger 58 the small stream will be metered and then expanded to cool ammonia passing through the heat exchanger 58 to the pipe tee 44. Dump outlets 59 pass outward form the heat exchanger 58 the portion of ammonia expanded for cooling, which is then passed to one or more of the applicator knives 20 for injection into the ground.

A second branch of the pipe tee 44 is connected to a liquid collector 52. The liquid collector 52 has a liquid outlet which only passes liquid to the control valve 76. An outlet of the control valve 76 is preferably connected to an ammonia inlet 72 of an ammonia vaporizer 62. An ammonia outlet 74 of the vaporizer 62 is connected to the breakaway coupling 26. The ammonia vaporizer 62 has a hydraulic fluid inlet 68 and a hydraulic fluid outlet 70 which are connected by the hydraulic hoses 36 to the hydraulic unit 17 and thus the hydraulic system of the tractor 16. Hydraulic fluid from the tractor 16 will pass between the hydraulic inlet 68 and the hydraulic outlet 70, and through the ammonia vaporizer 62, to heat the anhydrous ammonia passing through the ammonia vaporizer 62, between the ammonia inlet 72 and the ammonia outlet 74. The ammonia vapor is heated in the vaporizer 62 preferably to such an extent that all of the liquid ammonia entering the inlet 72 is converted to a vapor by the time it exits the vaporizer at the outlet 74. Vaporized anhydrous ammonia will flow from the vaporizer 62, through the ammonia outlet 74 and a trap with a fluid sensor 86, to a vapor compressor 42.

The ammonia vapor compressor 42 installed between the ammonia outlet 74 of the vaporizer 62 and the breakaway coupling 26. The vapor compressor 42 will compress the ammonia vapor from the vaporizer 62 to raise the pressure in the applicator tank 18 in addition to the pressure rise in the applicator tank 18 provided by vaporizing the ammonia in the vaporizer 62. Optionally, a liquid trap and with a liquid sensor 60 may be placed between the vaporizer 62 and the compressor 42 to assure that liquid will be removed prior to the ammonia flow entering the compressor 42, and if liquid is sensed from the discharge of the vaporizer 62 the system will shut down to prevent damage to the compressor 42. Vaporized anhydrous ammonia will be pushed form the vapor compressor 42, through the breakaway coupling 26, and back into the applicator tank 18 for maintaining a higher pressure in the applicator tank 18.

Figure 6:
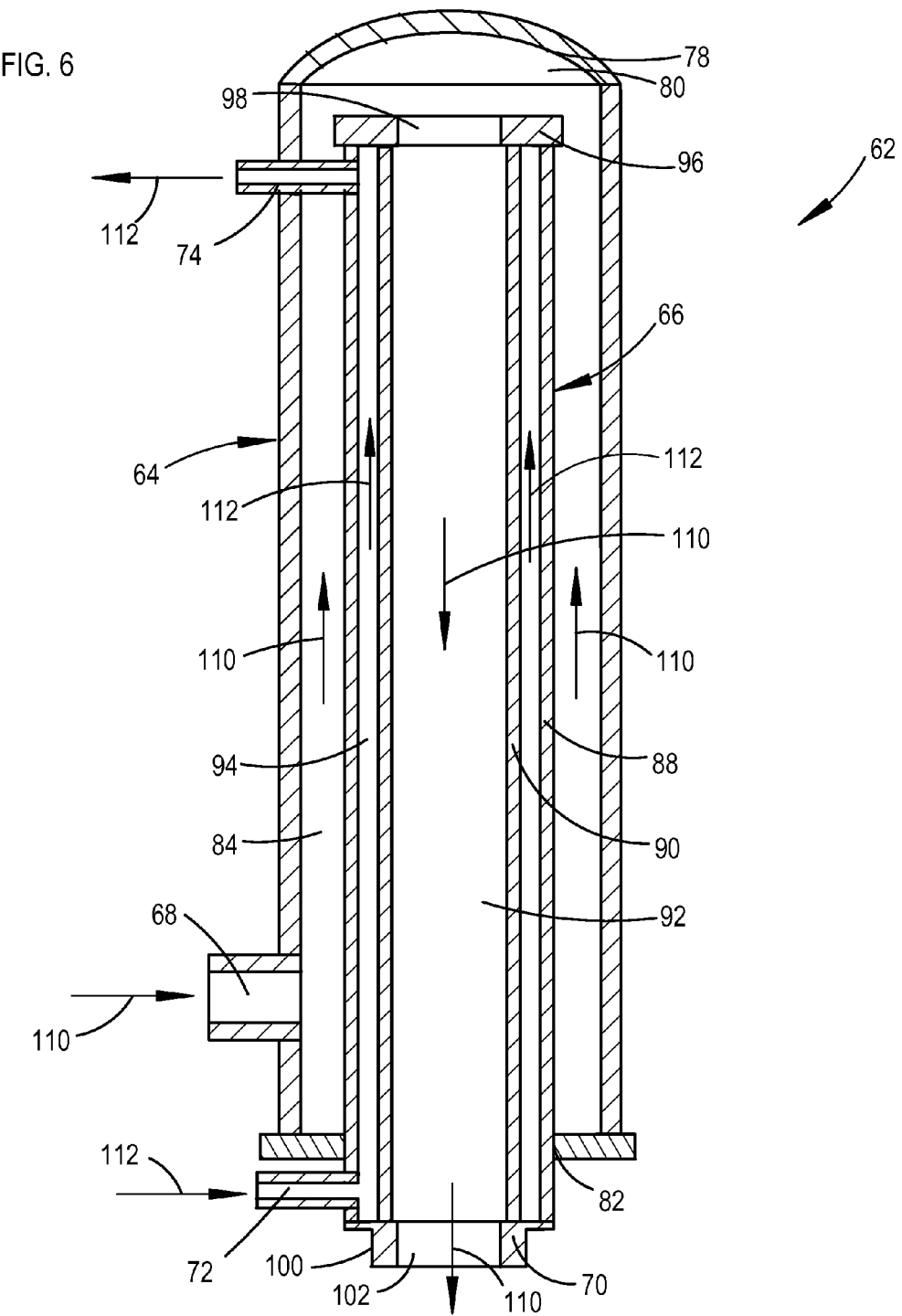

FIG. 6 is a longitudinal section view of the anhydrous ammonia heat vaporizer 62. The vaporizer 62 has a housing 64 and a dual wall flow tube assembly 66 which is inserted within the housing 64. The housing 64 provides a pressure vessel with an enclosed upper end 78 defining an end chamber 80, and an open lower end 82. The open lower end 82 receives the dual wall flow tube assembly 66 into the housing 64, with a fluid seal there-between. An outer annulus 84 extends between the interior of the housing 64 and the exterior of the dual wall flow tube assembly 66. The dual wall flow tube assembly 66 has an outward tube 88 and an inward tube 90, with the inward tube preferably concentrically disposed with the outward tube 88. A central flow chamber 92 extends within the inward tube 90. An inward annulus 94 extends between the outward tube 88 and the inward tube 90. An upper end cap 96 seals the upward end of the inward annulus 94, and has a central flow port 98 extending through the cap 96 for passing hydraulic fluid from the outer annulus 84 into the central flow chamber 92. A lower end cap 100 seals the lower end of the inward annulus 94, and has a central flow port 102 extending through the lower end cap 100 for passing hydraulic fluid from the central flow chamber 92 of the inward tube 90, and outward from the vaporizer 62. The inward annulus 94 passes anhydrous ammonia longitudinally there-through, from the ammonia inlet 72 to the ammonia outlet 74, with heat transferred to ammonia in the inner annulus 94 from the hydraulic fluid passing through the outer annulus 84 and the central flow chamber 82. The transferred heat preferably fully vaporizes the ammonia pumped into the vaporizer 62.

Figure 7:
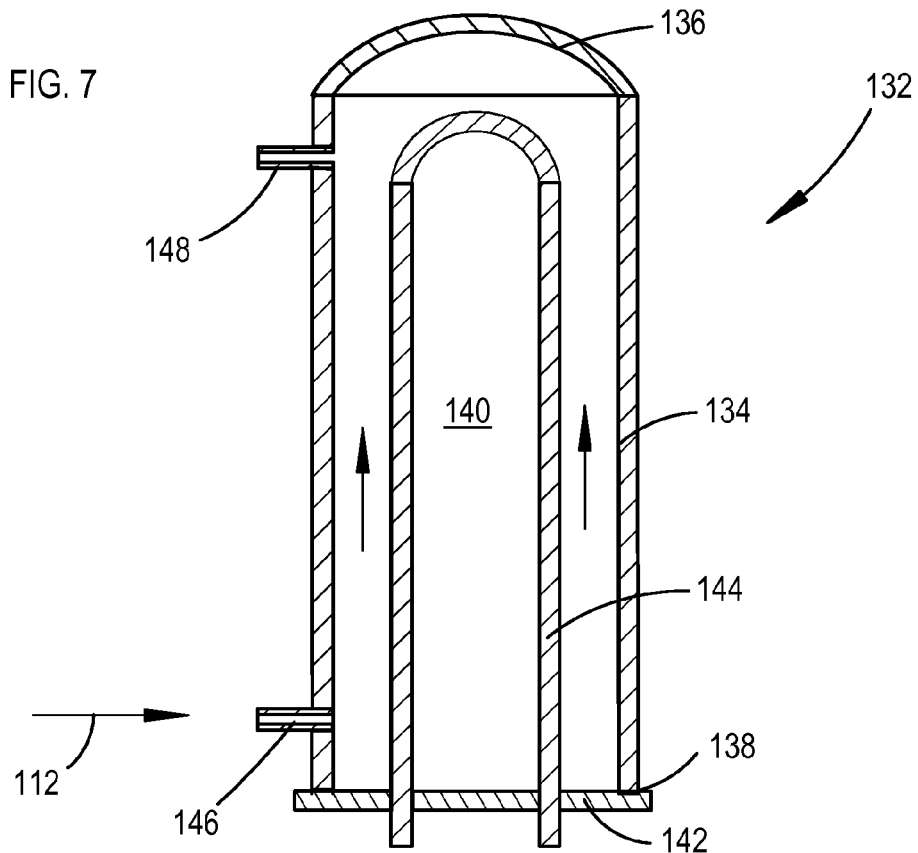

FIG. 7 is a longitudinal section view of an alternative anhydrous ammonia heat vaporizer 132. The vaporizer 132 has a housing 134 having an enclosed upper end 136, an open lower end 138, and a fluid chamber 140 disposed interiorly within the housing 134. A plug 142 encloses the lower end of the housing 134. An electric heating element 144 is mounted to the plug 142 and extends interiorly within the chamber 140 of the housing 134. A liquid ammonia inlet 146 and a vaporized ammonia outlet 148 provide fluid communication between the chamber 140 and the exterior of the housing 134. The vaporizer 132 may be used in place or the vaporizer 62 in FIGS. 3, 5 and 6. In some embodiments, the vaporizer 132 maybe used in conjunction with the vaporizer 62, preferably placing the vaporizer 132 in series with the vaporizer 62, and after the vaporizer 62. An alternating current electric power source is preferably provided for connecting the electric heating element 144, and may be provided a power inverter connected to a battery or directly from an AC generator. The DC power of the tractor 16 may also be used to provide to power an electric power inverter.

Figure 8:
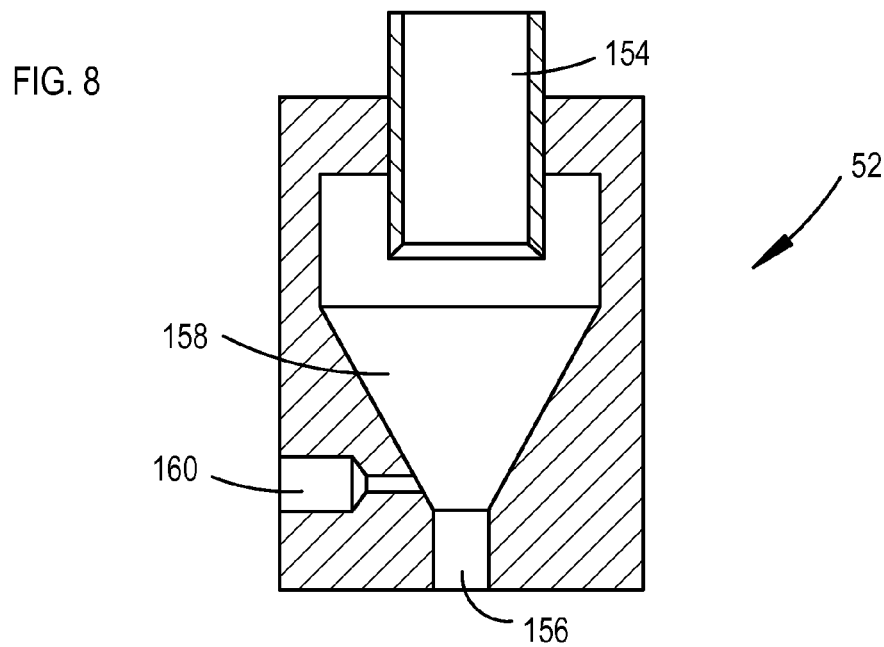

FIG. 8 is a longitudinal section view of a liquid collector 52. The liquid collector 52 has an inlet 154 and an outlet 156. A chamber 158 is provided for collecting liquid ammonia, which is then removed through the outlet 156. A secondary bleed port 160 is also provided. The port 160 may also be used for a pressure gauge or for receiving a liquid sensor.

Any vapor which enters the chamber 158 will pass upward through the inlet 154 due to being a lighter weight than the liquid ammonia.

FIGS. 9 and 10 are flow charts depicting processes for charging the applicator tank 18 with pressurized ammonia vapor. FIG. 9 shows a continuous process in steps 172-184 for removing ammonia vapor from the secondary caddy tank 21, compressing the ammonia vapor injecting the ammonia vapor into the ullage of the ammonia applicator tank 18. The process begins in step 172 and then the ammonia vapor is removed from the secondary caddy tank 21 in step 174. In step 176 the ammonia vapor is compressed. In step 178 the ammonia vapor is passed into the 32 in the applicator tank 18 to pressurize the ammonia in the tank 18 and assist in maintaining the pressure charge on the applicator tank 18.

FIG. 10 shows a continuous process in steps 192-204 for collecting a small stream of liquid ammonia from a main flow stream of liquid ammonia, vaporizing the small stream with heat, compressing the vapor, and passing the compressed vapor back through a vapor port 32 and into the applicator tank 18. The process stars in step 192. In step 194 a small stream of liquid ammonia is separated from the main flow stream passing to the flow dividers 12 and 19. In step 196 the small stream of the liquid ammonia is passed into the vaporizer 62 to provide a stream of ammonia vapor. The outlet of the vaporizer 62 is then passed through a vapor compressor in step 200. The compressed ammonia vapor is then injected into the nurse or applicator tank 202. The process stop in step 204. Injecting the pressurized and expanded liquid ammonia (expanded from a liquid to a gas phase) back into the applicator tank 18 in step 202 assists in maintaining the pressure charge on the applicator tank 18.

Thus the advantages of this invention provides a stream of compressed anhydrous ammonia vapor for injecting compressed ammonia vapor into an anhydrous ammonia applicator tank to maintain the static pressure within the applicator tank. The ammonia vapor may be taken from the vapor connection of a secondary caddy tank, or small liquid stream may be taken from the main flow stream for expanding to provide a vapor. A heat vaporizer may be used to vaporize the small liquid ammonia stream. Anhydrous ammonia expands up to 800 time its original volume during use. Liquid anhydrous ammonia vaporized and then compressed to charge a applicator tank to maintain a pressure charge on the applicator tank.

Although the preferred embodiment has been described in detail, it should be understood that various changes, substitutions and alterations can be made therein without departing from the spirit and scope of the invention as defined by the appended claims.

What is claimed is:

1. A method for charging an anhydrous ammonia applicator tank to maintain pressure during use in the field, said method comprising the steps of:
    providing a vapor compressor for transporting in the field with an ammonia distribution system which includes the anhydrous ammonia applicator tank and a tool bar;
    providing a flow of anhydrous ammonia vapor by:
        extracting a portion of a flow of liquid ammonia removed from the anhydrous ammonia applicator tank for passing to flow dividers and injection knives mounted to the tool bar;
        passing the portion of the flow of liquid ammonia to a heat vaporizer which expands the liquid ammonia to an expanded ammonia vapor;
        connecting the heat vaporizer to hydraulic flow lines which pass hydraulic fluid from the hydraulic unit of a tractor pulling the anhydrous ammonia applicator tank to the heat vaporizer; and
        using heat from the hydraulic fluid to heat the flow of liquid ammonia to said expanded ammonia vapor;
        wherein the expanded ammonia vapor provides the flow of anhydrous ammonia vapor passed through the vapor compressor;
    passing the flow of anhydrous ammonia vapor through the vapor compressor to provide a supply of compressed ammonia vapor; and
    injecting the compressed ammonia vapor into the anhydrous ammonia applicator tank.

2. A method for charging an anhydrous ammonia applicator tank to maintain pressure during use in the field, said method comprising the steps of:
    providing a vapor compressor for transporting in the field with an ammonia distribution system which includes the anhydrous ammonia applicator tank and a tool bar;
    providing a secondary anhydrous ammonia tank for transporting in the field with the anhydrous ammonia applicator tank and the tool bar; and
    connecting an ammonia vapor flow line to an outlet of the secondary anhydrous ammonia tank to provide a flow of anhydrous ammonia;
    passing the flow of anhydrous ammonia to a heat vaporizer which expands the anhydrous ammonia to an expanded ammonia vapor;
    connecting the heat vaporizer to hydraulic flow lines which pass hydraulic fluid from the hydraulic unit of a tractor pulling the anhydrous ammonia applicator tank to the heat vaporizer;
    using heat from the hydraulic fluid to heat the flow of anhydrous ammonia to the expanded ammonia vapor;
    passing the flow of anhydrous ammonia vapor through the vapor compressor to provide a supply of compressed ammonia vapor; and
    injecting the compressed ammonia vapor into the anhydrous ammonia applicator tank.

* * * * *